June 17, 1958
T. W. PRICKETT ET AL
2,839,328
LOAD CARRYING VEHICLE BODY
Filed Aug. 25, 1954
3 Sheets-Sheet 1
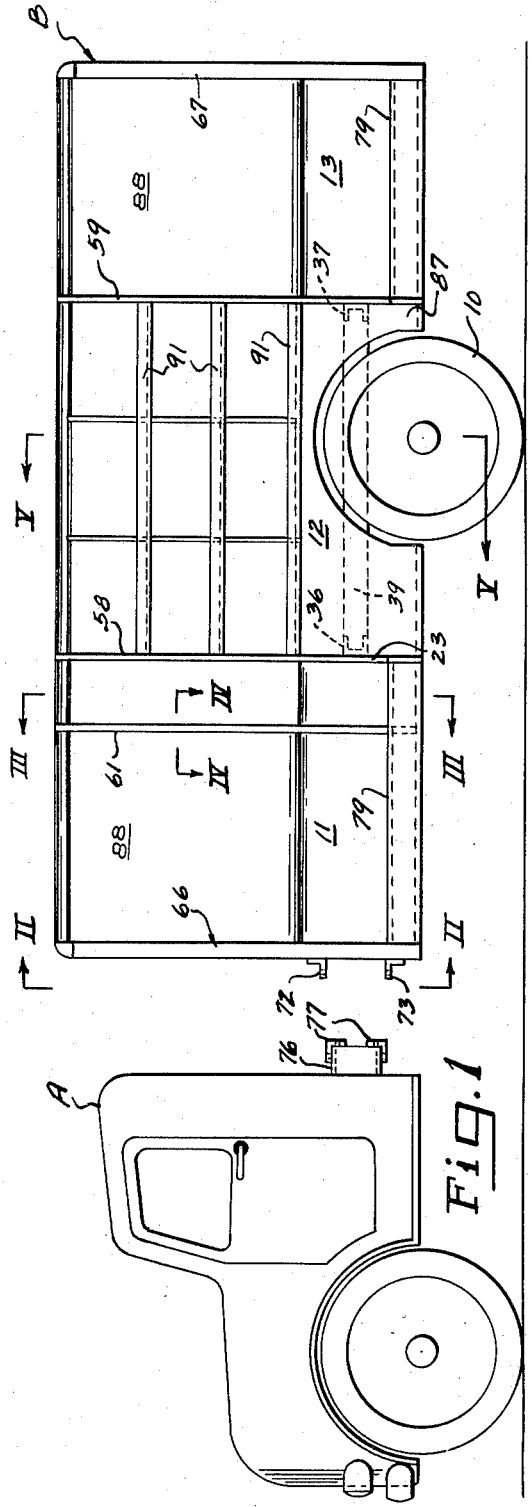
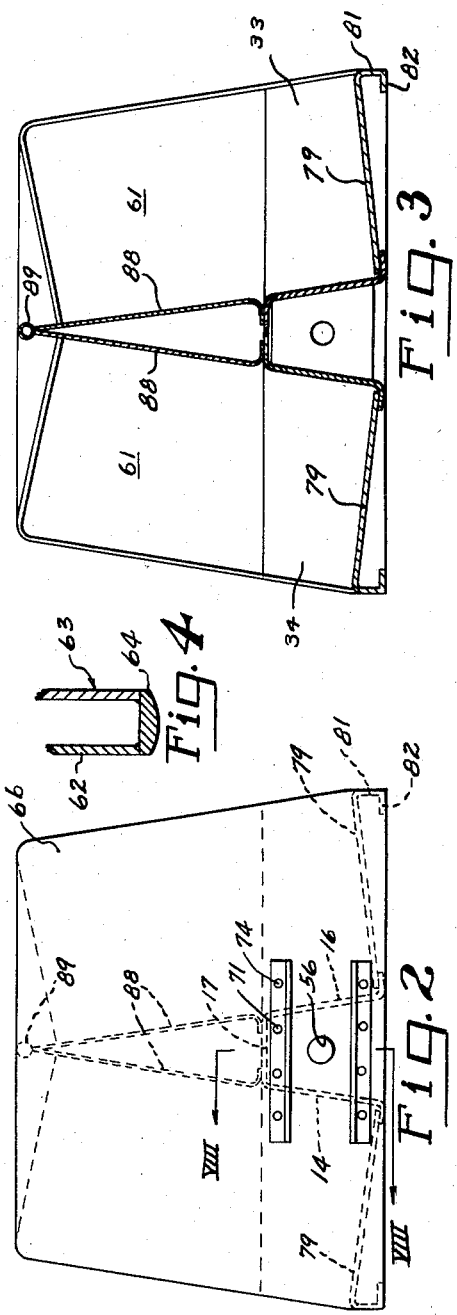
INVENTOR.
THOMAS W. PRICKETT
WOOTEN E. DUNCAN
BY
Jennings & Carter
ATTORNEYS June 17, 1958 T. W. PRICKETT ET AL 2,839,328
LOAD CARRYING VEHICLE BODY
Filed Aug. 25, 1954 3 Sheets-Sheet 2

INVENTOR.
THOMAS W. PRICKETT
WOOTEN E. DUNCAN
BY
Jennings & Carter
ATTORNEYS

June 17, 1958  T. W. PRICKETT ET AL  2,839,328
LOAD CARRYING VEHICLE BODY
Filed Aug. 25, 1954  3 Sheets-Sheet 3
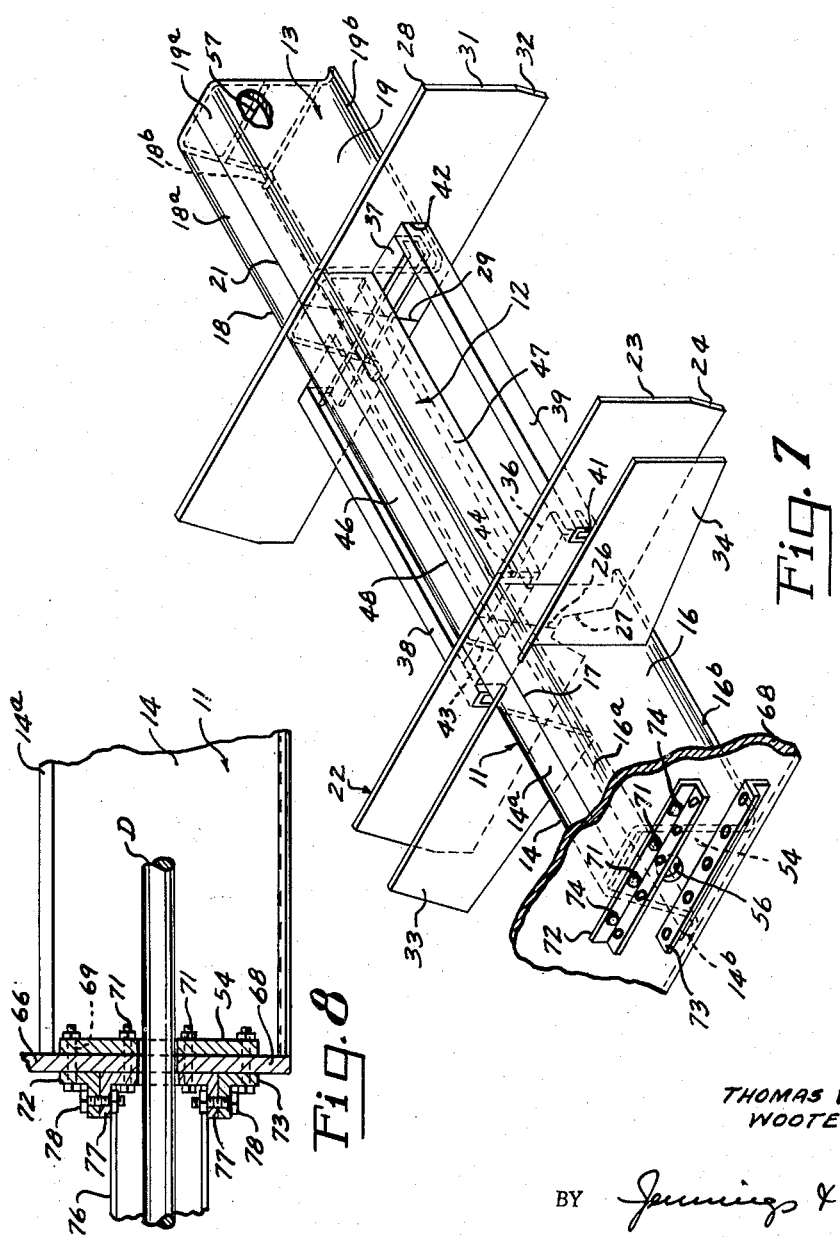
INVENTOR
THOMAS W. PRICKETT
WOOTEN E. DUNCAN
BY Jennings & Carter
ATTORNEYS United States Patent Office 2,839,328
Patented June 17, 1958

2,839,328

LOAD CARRYING VEHICLE BODY

Thomas W. Prickett and Wooten E. Duncan, Birmingham, Ala., assignors to Highway Trailers and Utilities of Alabama, Inc., a corporation of Alabama Application August 25, 1954, Serial No. 452,048

2 Claims. (Cl. 296—28)

This invention relates to vehicles and more particularly to a vehicle having a body in which certain of the load supporting and cargo carrying parts also serve as the frame for the vehicle and is an improvement on the vehicle described and claimed in the application of Arthur J. Robertson, Serial No. 353,987, filed May 11, 1953, now Patent No. 2,724,611, and entitled Load Carrying Vehicle Body.

More particularly, our invention relates to vehicle bodies of the type having open load carrying compartments for receiving cased goods, such as bottled soft drinks and the like and has for an object the provision of a load carrying vehicle body embodying pairs of separate sidewise opening compartments at opposite ends thereof and an intermediate through compartment therebetween, thereby providing an intermediate transverse compartment which may be loaded from either side and which permits the cased goods readily to be shifted from one side to the other.

A more specific object of our invention is to provide a load carrying vehicle body of the character designated in which the intermediate transverse compartment is provided with a plurality of vertically and horizontally spaced supporting guideways which permit cased goods to be supported at different levels, thereby facilitating removal of individual cases without disturbing or removing other cases.

Another object of our invention is to provide a load carrying vehicle body of the character designated which shall include separate opposed compartments on either side of the longitudinal center line of the body between the intermediate transverse compartment and one of the pairs of opposed compartments.

A further object of our invention is to provide a motor vehicle in which the load carrying and draft sustaining frame of the cargo carrying body is generally of inverted U-shape as viewed in transverse section and runs the length of the cargo carrying body, together with vertically extending transverse plates secured to the inverted U-shape frame and projecting outwardly on either side thereof, defining compartments at opposite ends of the body with at least one intermediate through compartment therebetween.

A further object of our invention is to provide a load carrying vehicle frame having separate opposed compartments at opposite ends thereof, thus adapting the same for receiving stacked cases of goods loaded on pallets.

A still further object of our invention is to provide a load carrying and draft sustaining vehicle frame of the character designated which shall be simple of construction, economical of manufacture and one which is particularly adapted for use in the delivery of cased drinks where a variety of flavors are handled.

Heretofore in the art to which our invention relates various types of vehicle bodies have been devised for transporting cased goods. While such bodies have been satisfactory for transporting cased drinks where a single flavor is handled, they have been unsatisfactory for transporting and handling multiple flavors. Such cases have heretofore been stacked on top of each other so that only a few could be removed without disturbing or removing other cases. Accordingly, cases of different flavors could not be readily removed from the body. Also, difficulties have been encountered in the handling of empty bottles due to the fact that they must be loaded on the body while there are full cases in place in the body.

To overcome these and other difficulties, we provide a load carrying vehicle body embodying a generally inverted U-shaped frame extending the length of the vehicle body along the longitudinal center thereof together with pairs of separate opposed compartments at opposite ends thereof and an intermediate through compartment between the forward and aft compartments. Also, separate opposed compartments are provided between the intermediate compartment and one of the pairs of opposed compartments, preferably just forward of the intermediate compartment. With such a construction the cases of drinks having the largest volume of sales will be stacked one on top of another in at least one of the separate opposed forward or aft compartments. The variety of flavors in their cases are stacked in rows in the through intermediate compartment thereby permitting selected ones of the cases to be removed without having to disturb other cases. Due to the fact that the cases in the separate opposed compartments at the front and rear of the frame each contain a single flavor, they are removed from the top down without having to disturb other cases. The separate opposed compartments between the intermediate through compartment and the opposed compartments at one end of the frame are empty at the beginning of the delivery of the cases and are employed to receive cases containing empty bottles, thereby eliminating the necessity of having to place cases containing empty bottles on top of cases containing full bottles. By the time the compartment for receiving the empty bottle cases is filled, other compartments on the frame are available to receive other empty bottle cases without having to stack such cases on top of full bottle cases.

A vehicle illustrating features of our invention is shown on the accompanying drawings forming a part of this application in which:

Fig. 1 is a side elevational view of the vehicle showing the front end of the vehicle separated from the cargo carrying body;

Fig. 2 is a front elevational view of the cargo carrying section taken along the line II—II of Fig. 1;

Fig. 3 is a sectional view taken along the line III—III of Fig. 1;

Fig. 4 is an enlarged detail sectional view taken generally along the line IV—IV of Fig. 1;

Fig. 7 is a somewhat diagrammatic isometric view of the main load carrying plate framework of the cargo carrying section, certain of the parts being omitted for the sake of clarity; and, Fig. 8 is a sectional view taken generally along the line VIII—VIII of Fig. 2, showing the vehicle connected to the cargo carrying body.

Figure 5:
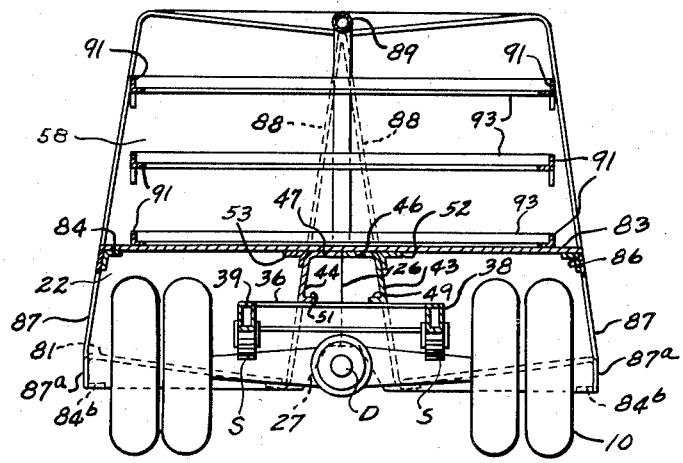
Fig. 5 is a sectional view through the intermediate through compartment of the cargo carrying body taken generally along the line V—V of Fig. 1.

Referring now to the drawings for a better understanding of our invention, we show a vehicle divided into two main sections A and B. The section A comprises the front end of the vehicle and includes the motor, the transmission, front wheels, steering apparatus and the driver's cab. Section B is the cargo carrying section and comprises the rear wheels 10 and the cargo carrying body proper. The frame of the cargo body comprises a front section 11, an intermediate section 12 and a rear section 13. As shown in Fig. 7, the section 11 is of an inverted U-shape as viewed in transverse section and is formed of longitudinally extending plates 14 and 16 each of which is somewhat Z-shaped as viewed in transverse section. That is, the plates 14 and 16 have inwardly extending horizontal flanges 14a and 16a, respectively, at the upper ends thereof and outturned flanges 14b and 16b, respectively, at the bottom edges thereof. The upper inturned flanges 14a and 16a are welded together along a line 17, thus forming a rigid inverted U-shaped structure. In like manner, the rear section 13 is of an inverted U-shape as viewed in transverse section and is formed of Z-shaped plates 18 and 19 having upper inturned flanges 18a and 19a and outturned flanges 18b and 19b respectively, at the bottom edges thereof. Also, the inturned flanges 18a and 19a are welded together along a line 21.

Welded to the inner edges of the plates 14 and 16 of the frame section 11 is a vertical cross plate 22 having an upper edge which extends in a substantially horizontal plane. The outer edges of the plate 22 slope downwardly and outwardly as at 23 and then vertically as at 24. For convenience of construction, the plate 22 may be made of identical halves and welded together along the vertical meeting center line 26. The plate 22 is also provided with a downwardly opening cut-out 27 for passing the drive shaft D which leads to the differential of the rear axle in a manner well understood.

Welded to the vertical inner edges of the plates 18 and 19 is a vertically extending cross plate 28 which is substantially identical with cross plate 22. The plate 28 may also be formed in halves and welded together along the vertical center line 29. The upper edge of the cross plate 28 lies in substantially the same horizontal plane as the upper edge of the plate 22 and the outer edges thereof slope downwardly and outwardly as at 31 and thence vertically as at 32.

Secured to the sides of the plates 14 and 16 of the frame section 11 and projecting outwardly therefrom in vertical planes substantially parallel to the cross plates 22 are transverse plates 33 and 34. The plates 33 and 34 are secured to the plates 14 and 16 by any suitable means, such as by welding, and are spaced from the cross plate 22 a distance to receive therebetween a stack of the cases to be transported.

Extending transversely across the inner face of the plate 22 is a length of channel 36. Also secured to the inside of the plate 28 is a transverse length of channel 37 connecting the channels 36 and 37. At opposite sides of the vehicle, as shown in Figs. 5 and 7, are longitudinally disposed short sections of frame 38 and 39. The longitudinal frame sections 38 and 39 project through holes 41 and 42 in the plates 22 and 28, respectively, and the ends of the sections 38 and 39 are welded in the holes of the plates.

The intermediate frame section 12 comprises an inverted U-shaped member formed of side plates 43 and 44 having upper horizontal inturned flanges 46 and 47, respectively, welded together along a line 48. The side plates 43 and 44 are provided with inturned flanges 49 and 51, respectively, which are disposed to rest on the transverse channel members 36 and 37 and are secured thereto by any suitable means, such as by welding. Angles 52 and 53 are welded to the plates 43 and 44 adjacent the upper portions thereof with the upper flanges of the angles lying flush with the inturned flanges 46 and 47, thus adding strength to the assembly and serving partially to support a portion of the load carrying deck to be described hereinafter.

Welded between the plates 14 and 16 at the front end of the section 11 is a plate member 54 having an opening 56 therein to pass the drive shaft D. In like manner welded between the plates 18 and 19 at the rear end of the section 13 is a plate member 57.

Figure 6:
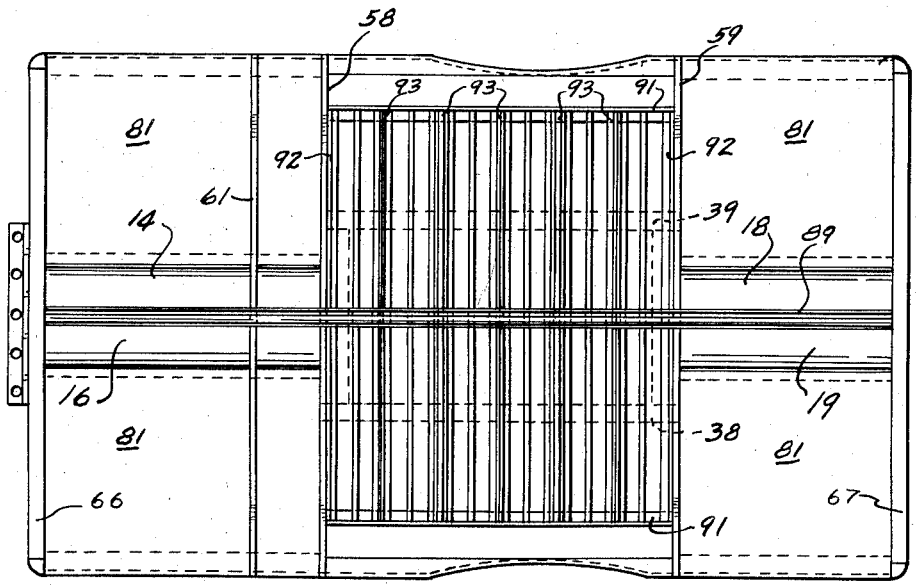
Fig. 6 is a plan view of the cargo carrying body.

As shown in Figs. 1 and 6, the body comprises vertical partition walls 58 between the front section 11 and the intermediate section 12 and vertical partition walls 59 between the intermediate section 12 and the rear section 13. Also, the front section 11 is divided by partition walls 61 spaced from the partition wall 58 a distance to receive therebetween a single vertical row of the cases to be transported. The vertical partition walls 58, 59 and 61 are preferably formed of spaced plates 62 and 63 connected at their outer edges, as by welding, to a vertical member 64. The plates 62 and 63 of the partition walls 61 are also welded along the bottom edges thereof to the top of their associated transverse plates 22, 28 and 33, 34.

Positioned in front of the section 11 is a vertical front wall 66 and positioned rearwardly of the section 13 is a rear wall 67. The portion of the front wall 66 immediately in front of the front section 11 is in the form of a relatively heavy plate 68. As shown in Fig. 8, the plate 68 and the plate member 54 are provided with aligned openings 69 therethrough for receiving bolts 71. Rigidly secured to the plate 68 and the plate member 54 by means of the bolts 71 are vertically spaced angle members 72 and 73 which extend in horizontal planes parallel to each other. The angle members 72 and 73 are also secured to the plate 68 at points outwardly of the plate member 54 by means of bolts 74, thus adding further strength to the structure.

Extending rearwardly from the front section A of the vehicle are transversely spaced channel members 76 joined by transverse angles 77 having suitable openings therethrough for receiving bolts 78, thus rigidly securing the two halves of the vehicle together in both vertical and horizontal planes.

The frame sections 11 and 13 are provided with load carrying plates 79 which rest at their inner edges on the outturned flanges 14b—16b and 18b—19b, respectively. Preferably, the inner edges of the load carrying plate 79 are welded to the outturned flanges. The outer edges of the load carrying plate 79 are turned downwardly as at 81 and then inwardly as at 82. Also, the load carrying plates 79 are of a length to fit snugly against the plates 22 and 28, as the case may be, and their respective front or rear wall so that the load carrying plates may be welded to the transverse plates and their associated front or rear wall to form a strong, unitary structure.

As shown in Fig. 5, the intermediate section 12 is provided with a load carrying plate 83 supported along its longitudinal center line by the inturned flanges 46 and 47 of the longitudinal plates 43 and 44. The load carrying plate 83 is further supported by the angles 52 and 53 mounted alongside the plates 43 and 44. The outer edges of the load carrying plate 83 are secured to angle members 84 and 86 extending between and welded to the plates 22 and 28.

Wheel cover plates 87 are provided at each side of the frame to strengthen the same and enhance the ornamental appearance thereof. The cover plates 87 have vertical sections 87a adjacent their lower ends and inturned flanges 84b which lie in the same horizontal plane with the inturned portions 82 of the load carrying plate 79. Mounted on top of the base of the inverted U-shape frame sections 11 and 13 and projecting upwardly and inwardly thereof are metal plates 88 which form a center partition for the frame sections 11 and 13. A round pipe-like member 89 extends from end to end of the frame section B and forms a cap for the plates 88.

As shown in Fig. 5 of the drawings, the springs for supporting the section B, indicated by the letter S, are carried by the longitudinal sections 38 and 39 of the frame in a somewhat conventional manner. All of the load of the body supported by the rear wheels 10 is thus transmitted through the springs S, frame members 38 and 39, and thence to the main backbone frame, consisting of the sections 11, 12 and 13 together with their vertical transverse plates.

As shown in Figs. 1, 5 and 6, the compartment defined between the transverse partition walls 58 and 59 is not divided by a longitudinally extending partition wall, but forms a through compartment which extends the width of the frame section B. The through compartment also extends the entire length of the section 12 of the U-shaped framework. Extending between and secured to the transverse partition walls 58 and 59 and spaced vertically from each other at each side of the frame are longitudinally extending angle members 91. Extending transversely of the intermediate through compartment adjacent the partition walls 58 and 59, are angles 92 having inwardly extending lower flanges. Extending transversely of the intermediate through compartment between the angles 92 are longitudinally spaced support members 93, each being in the shape of an inverted T as viewed in transverse section. The support members 93 are parallel to each other and are spaced from each other a distance to receive slidably therebetween the cases to be transported. Also, the support members 93 adjacent the angles 92 are spaced from the angles a distance to support therebetween the cases to be transported. The angles 92 and support members 93 thus form transverse support members which permit the cases to be moved in sliding contact therewith from one side of the through compartment to the other. By providing such an intermediate through compartment, a large number of different flavors of drinks or different bottle sizes may be loaded from opposite sides of the through compartment or moved from one side to the other. For example, we show three longitudinally extending channels 91 at each side of the frame and provide six transverse spaces for receiving cases along each of the angles 91. Accordingly, in the intermediate compartment there would be a total of 18 transverse spaces for receiving cases. Since the cases may be loaded or removed from either side of the frame, we provide a total of 36 spaces in the intermediate compartment for receiving cases containing multiple flavors. Any one of the 36 cases, each containing a different flavor, may be removed without the necessity of first removing other cases.

From the foregoing it will be seen that we have devised an improved vehicle having a body thereon especially adapted for hauling cased goods such as soft drinks. By constructing separate opposed compartments at the front and rear of the frame and an intermediate through compartment adapted to receive a plurality of cases containing different flavors, a case containing any desired flavor may be readily removed from the vehicle. In actual practice we have found that with such a construction the particular flavor having the greatest volume of sale may be placed in one or more of the separate opposed compartments at the ends of the frame by stacking the cases on a pallet and loading and unloading the same as a unit while on the pallet. The flavors having less volume of sales are carried in one of the transverse spaces of the intermediate compartment. Also, the compartments positioned between the transverse partition walls 58 and 61 are especially adapted for receiving cases containing empty bottles, thus permitting the empty bottle cases to be placed there during the first part of the delivery. By the time this compartment is filled with empty bottle cases, the full bottle cases from other compartments will have been removed, thus permitting the full bottle cases to be removed without having to first remove empty bottle cases.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In a vehicle for carrying cased goods, a combined load carrying and draft sustaining chassis and body frame generally of inverted U-shape as viewed in transverse section and formed of plate-like members which extend substantially the length of the frame immediately on either side of the longitudinal center thereof, said frame being relatively narrow and being the principal load carrying member in the chassis and body, a pair of vertically extending transverse plates secured to the longitudinal plates and projecting outwardly on either side thereof, said pair of vertically extending plates forming lower, transverse walls for cargo compartments located at opposite ends of the frame, means secured to the U-shaped frame forming bottoms for said compartments and located below the top of said U-shaped frame, an open intermediate cargo compartment between the pair of transverse plates and the end compartments, a bottom for the intermediate cargo compartment located above the top of said U-shaped frame and extending across substantially the entire width of the vehicle, a plurality of vertically spaced, horizontal unobstructed plates in said intermediate compartment above said bottom and extending across substantially the entire width of the vehicle whereby cased goods may be loaded for carrying on any portion of the bottom and the vertically spaced plates from either side of the vehicle, and longitudinally extending plate-like members separating said compartments at the ends of the frame into separate opposed compartments which lie on either side of the center line of the body.

2. In a vehicle for carrying cased goods, a combined load carrying vehicle chassis and body frame comprising a pair of longitudinal plates spaced laterally apart and having abutting inturned flanges adjacent the tops thereof, means securing said abutting flanges rigidly together thereby providing a centrally disposed load and draft sustaining chassis and body frame having continuous longitudinal plate members on either side of the longitudinal center line of the vehicle, lower transverse longitudinally spaced load carrying plates secured to the longitudinal plates intermediate the ends thereof and projecting outwardly on either side thereof, said lower transverse spaced plates being the lower transverse walls of end compartments extending below the top of the frame, upper transverse plates secured to the upper edges of said lower plates and providing front and rear walls for an open intermediate compartment between the end compartments, a bottom for the intermediate compartment located above the top of said frame and extending across substantially the entire width of the vehicle, a plurality of vertically spaced horizontal unobstructed plates in said intermediate compartment above said bottom and extending across substantially the entire width of the vehicle whereby cased goods may be loaded for carrying on any portion of the bottom and the vertically spaced plates from either side of the vehicle, longitudinally extending plate members separating the end compartments into separate opposed compartments on either side of the center line of the vehicle, running gear embodying supporting wheels located between two of said transverse longitudinally spaced load carrying plates, means connecting the running gear to the said transverse load supporting plates and to the longitudinal plates, and inwardly sloping load carrying decks forming bottoms for said end compartments secured to and projecting outwardly of the longitudinal plates.

References Cited in the file of this patent
UNITED STATES PATENTS
Re. 23,848    Gerhardt _____ July 6, 1954

(Other references on following page)

UNITED STATES PATENTS

| | | |
|---|---|---|
| 562,162 | Walsh | June 16, 1896 |
| 1,131,045 | Dunham | Mar. 9, 1915 |
| 1,341,744 | Hatch | June 1, 1920 |
| 2,061,673 | Robinson | Nov. 24, 1936 |
| 2,650,856 | Mashburn et al. | Sept. 1, 1953 |
| 2,724,611 | Robertson | Nov. 22, 1955 |

OTHER REFERENCES

"Bottler's Body," article in "Commercial Car Journal," vol. LXXX, issue Dec. 4, 1950, pp. 62, 63 and 114.

"Body for Fruit and Vegetable Vender," article in "Motor Vehicle Monthly," November 1926, pp. 29, 30 and 31.